United States Patent
Horn et al.

(10) Patent No.: US 10,355,985 B2
(45) Date of Patent: Jul. 16, 2019

(54) NETWORK PROPERTY VERIFICATION

(71) Applicant: FUJITSU LIMITED, Kawasaki-shi, Kanagawa (JP)

(72) Inventors: Alex Horn, Sunnyvale, CA (US); Mukul R. Prasad, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 199 days.

(21) Appl. No.: 15/411,952

(22) Filed: Jan. 20, 2017

(65) Prior Publication Data
US 2018/0212870 A1   Jul. 26, 2018

(51) Int. Cl.
| | |
|---|---|
| *H04L 12/753* | (2013.01) |
| *H04L 12/46* | (2006.01) |
| *H04L 12/723* | (2013.01) |
| *H04L 29/06* | (2006.01) |
| *H04L 29/08* | (2006.01) |

(52) U.S. Cl.
CPC .......... *H04L 45/48* (2013.01); *H04L 12/4633* (2013.01); *H04L 45/50* (2013.01); *H04L 67/22* (2013.01); *H04L 67/26* (2013.01); *H04L 67/2814* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 9,225,601 B2 | 12/2015 | Khurshid et al. | |
| 2009/0171890 A1* | 7/2009 | Johnson | ............ G06F 17/30516 |
| 2010/0061378 A1* | 3/2010 | Joyner | ................ H04L 12/4633 |
| | | | 370/395.53 |
| 2018/0189042 A1* | 7/2018 | Noonan | .................. G06F 8/437 |

OTHER PUBLICATIONS

Chen et al., "Global Model Checking on Pushdown Multi-Agent Systems," AAAI Publications, Thirtieth AAAI Conference on Artificial Intelligence, AAAI-16, Mar. 3, 2016, pp. 2459-2469. (Year: 2016).*
Schwoon, Stefan, "Efficient Verification of Sequential and Concurrent Systems," Mémoire d'Habilitation à Diriger des Recherches, Dec. 2013, pp. 1-109. (Year: 2013).*
(Continued)

*Primary Examiner* — Donald L Mills
(74) *Attorney, Agent, or Firm* — Maschoff Brennan

(57) ABSTRACT

A method of network property verification may include obtaining one or more properties of a network to verify, and obtaining first forwarding rules for a first network device in the network, where the first forwarding rules are indicative of how the first network device handles an incoming packet with a variable-length packet header. The method may also include obtaining second forwarding rules for a second network device in the network, the second forwarding rules indicative of how the second network device handles the incoming packet, and generating a pushdown automata based on the first and the second forwarding rules. The method may additionally include applying a saturation-based algorithm to the pushdown automata to verify the one or more properties of the network.

17 Claims, 7 Drawing Sheets

(56) References Cited

OTHER PUBLICATIONS

Al-Shaer, E., and Al-Haj, S., "FlowChecker: Configuration Analysis and Verification of Federated OpenFlow Infrastructures", Proceedings of the 3rd ACM Workshop on Assurable and Usable Security Configuration, SafeConfig 10, Oct. 2010, pp. 37-44.

Al-Shaer et al., "Network Configuration in a Box: Towards End-to-End Verification of Network Reachability and Security", 17th IEEE International Conference on Network Protocols, ICNP 2009, Oct. 13-16, 2009, pp. 123-132.

Application filed for U.S. Appl. No. 15/389,260, filed Dec. 22, 2016.

Awduche et al., "Requirements for Traffic Engineering Over MPLS", RFC2702, The Internet Society, Sep. 1999, pp. 1-30.

Ball et al. "VeriCon: Towards Verifying Controller Programs in Software-Defined Networks", Proceedings of the 35th ACM SIGPLAN Conference on Programming Language Design and Implementation, vol. 49, Issue 6, Jun. 9-11, 2014, pp. 282-293.

Beckett et al. "An Assertion Language for Debugging SDN Applications", Proceedings of the Third Workshop on Hot topics in Software Defined Networking, HotSDN '14, Aug. 22, 2014, pp. 1-6.

Bjørner et al., "ddNF: An Efficient Data Structure for Header Spaces", Technical Representative, Microsoft Research, 2015, pp. 1-16.

Canini et al., "A NICE Way to Test OpenFlow Applications", Proceedings of the 9th USENIX conference on Networked Systems Design and Implementation, NSDI'12, Apr. 25-27, 2012, pp. 1-14.

Fayaz et al., "BUZZ: Testing Context-Dependent Policies in Stateful Networks", Proceedings of the 13th USENIX Symposium on Networked Systems Design and Implementation (NSDI'16), USENIX Association, Mar. 16-18, 2016, pp. 275-289.

Fayaz, S.K., and Sekar, V., "Testing Stateful and Dynamic Data Planes with FlowTest", Proceedings of the Third Workshop on Hot topics in Software Defined Networking, HotSDN '14, Aug. 22, 2014, pp. 1-6.

Fogel et al., "A General Approach to Network Configuration Analysis", Proceedings of the 12th USENIX Conference on Networked Systems Design and Implementation, NSDI'15, May 4-6, 2015, pp. 469-483.

Gember-Jacobson et al., "Fast Control Plane Analysis Using an Abstract Representation", Proceedings of the 2016 conference on ACM SIGCOMM, Aug. 22-26, 2016, pp. 1-14.

Jayaraman et al., "Automated Analysis and Debugging of Network Connectivity Policies", Technical Representative, Microsoft Research, 2014, pp. 1-11.

Jeffrey A., and Samak, T., "Model Checking Firewall Policy Configurations", Proceedings of the 10th IEEE International Conference on Policies for Distributed Systems and Networks, POLICY'09, Jul. 20-22, 2009, pp. 60-67.

Kazemian et al., "Header Space Analysis: Static Checking for Networks", Proceedings of the 9th USENIX conference on Networked Systems Design and Implementation, NSDI'12, Apr. 25-27, 2012, pp. 1-14.

Kazemian et al., "Real Time Network Policy Checking using Header Space Analysis", Proceedings of the 10th USENIX conference on Networked Systems Design and Implementation, Apr. 2-5, 2013, pp. 99-111.

Khurshid et al., "VeriFlow: Verifying Network-Wide Invariants in Real Time", Proceedings of the 10th USENIX conference on Networked Systems Design and Implementation, Apr. 2-5, 2013, pp. 1-13.

Lopes et al., "Checking Beliefs in Dynamic Networks", Proceedings of the 12th USENIX Conference on Networked Systems Design and Implementation, May 4-6, 2015, pp. 499-512.

Mai et al., "Debugging the Data Plane with Anteater", Proceedings of the ACM SIGCOMM 2011 conference, Aug. 15-19, 2011, pp. 1-12.

Maldonado-Lopez et al., "Detection and prevention of firewall-rule conflicts on software-defined networking", 7th International Workshop on Reliable Networks Design and Modeling (RNDM), Oct. 5-7, 2015.

Nelson et al., "The Margrave Tool for Firewall Analysis", USENIX Large Installation System Administration Conference, 2010, pp. 1-18.

Sommers et al., "On the Prevalence and Characteristics of MPLS Deployments in the Open Internet", ACM IMC, Nov. 2-4, 2011, pp. 1-14.

Son et al., "Model Checking Invariant Security Properties in OpenFlow", IEEE International Conference on Communications (ICC), Jun. 2013, pp. 1-6.

Stoenescu et al., "SymNet: scalable symbolic execution for modern networks", Proceedings of the 2016 conference on ACM, SIGCOMM '16, Aug. 22-26, 2016, pp. 1-14.

Velner et al., "Some Complexity Results for Stateful Network Verification", Proceedings of the 22nd International Conference on Tools and Algorithms for the Construction and Analysis of Systems, vol. 9636, Apr. 2-8, 2016, pp. 1-17.

Xie et al., "On Static Reachability Analysis of IP Networks", 24th Annual Joint Conference of the IEEE Computer and Communications Societies, INFOCOM, Mar. 2005, pp. 1-14.

Yang, H. & Lam, S.S., "Real-Time Verification of Network Properties Using Atomic Predicates", 21st IEEE International Conference on Network Protocols, ICNP, 2013, pp. 1-11.

Yuan et al., "FIREMAN: A Toolkit for FIREwall Modeling and Analysis", IEEE Symposium on Security and Privacy, May 2006, pp. 1-15.

* cited by examiner

NETWORK PROPERTY VERIFICATION

FIELD

The embodiments discussed in the present disclosure are related to network property verification.

BACKGROUND

With the proliferation of computer networks, there has also arisen a variety of different protocols associated with such computer networks. For example, some networks utilize internet protocol (IP) to communicate. As another example, some networks utilize multiprotocol label switching (MPLS) to communicate. In some cases, approximately 25% of paths across the Internet traverse at least some portion of an MPLS network.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method of network property verification. The method may include obtaining one or more properties of a network to verify, and obtaining first forwarding rules for a first network device in the network. The first forwarding rules may be indicative of how the first network device handles an incoming packet with a variable-length packet header. The method may also include obtaining second forwarding rules for a second network device in the network. The second forwarding rules may be indicative of how the second network device handles the incoming packet. The method may additionally include generating a pushdown automata based on the first and the second forwarding rules and applying a saturation-based algorithm to the pushdown automata to verify the one or more properties of the network.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
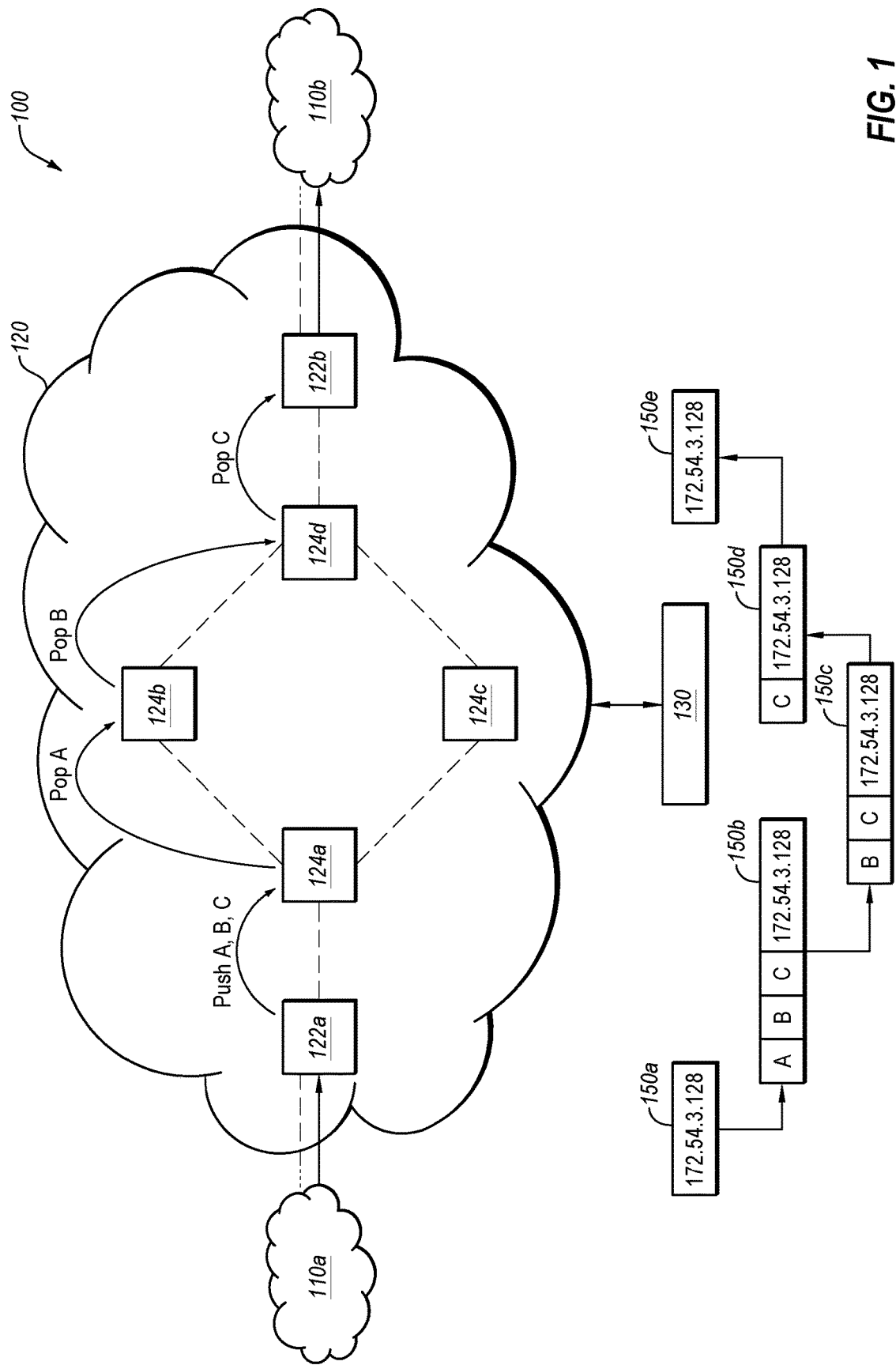
FIG. 1 illustrates an example environment related to network property verification.

Some embodiments of the present disclosure relate to network property verification, including network path verification for packets traversing a multiprotocol label switching (MPLS) network. One example of an MPLS network is a network that uses encapsulation and de-encapsulation techniques to allow a packet to tunnel through the MPLS network. An example of such a tunnel may include an IP packet that arrives at an edge network device at the edge of the MPLS network. The edge network device, in turn, may encapsulate the IP packet with a series of labels as part of the header that serve as instructions as to where the encapsulated packet is to be routed through the MPLS network. The labels may be selected based on data included in the packet, the IP address to which the packet is directed, or any other information related to the packet. As the encapsulated packet traverses the MPLS network, each network device in the MPLS network typically reads the outside label to determine how that network device will forward the packet. Additionally, one or more of the network devices in the MPLS network may have instructions to further encapsulate the packet with one or more additional labels, de-encapsulate one or more labels, or forward the packet without modification of the header. As the packet reaches an edge router on the far side of the MPLS network, the edge router may have forwarding rules to route the packet out of the MPLS network. Thus, packets traversing the MPLS network through a tunnel may have headers of variable length depending on the number of labels with which the packet is encapsulated.

Because of the variable nature of the packet headers in an MPLS network, analyzing and verifying network paths through an MPLS network may be more complex and difficult as compared to analyzing and verifying network paths through non-MPLS networks. For example, non-MPLS network analyses may be based on an IP address to which a packet is directed. As another example, MPLS network analyses or verification techniques may depend on a fixed header size, or a cap on header size and may be unable to handle packets with an indeterminate header size. As such, analyses and/or verification based on IP addresses and/or a particular or capped header size may limit the functionality and potential scope of MPLS networks that may use larger headers or headers of indeterminate size. Some embodiments of the present disclosure provide a solution that may verify and/or analyze packets of variable header length such that any number of labels may be used and any size of MPLS network may be used. Furthermore, some embodiments of the present disclosure may verify and/or analyze packets of an indeterminate header size and uncapped header size. Thus, some embodiments of the present disclosure provide a solution that improves the functioning of computers and networks, and also provide improvements to the field of network verification.

In some embodiments, to verify a network property, a control device may obtain the forwarding rules for the network devices in an MPLS network. The control device may use the forwarding rules to generate a pushdown automata to represent the network. For example, each network device in the MPLS network may be represented as a state and the transition between states may be represented as a push operation (corresponding to encapsulation of a packet with another label), a pop operation (corresponding to de-encapsulation of the packet to remove a label), or some combination of one or more of the push and/or pop operations. The pushdown automata may be used to verify one or more properties of the network. For example, a path between one state and another state may be verified, which may correspond to the verification of a path or tunnel between one network device and another network device. As another example, the number of hops taken by a packet along a path may be verified, which may help to determine how quickly a packet may traverse the MPLS network.

In some embodiments, network property verification as described in some embodiments of the present disclosure may be addressed as a reachability problem. In these and other embodiments, the reachability problem may be addressed by applying a saturation-based algorithm to the pushdown automata. For example, the reachability problem may be analogized to a Dyck-context free language (CFL) reachability problem. In these and other embodiments, the saturation-based algorithm may explore the reachability space of the pushdown automata by generating tuples that explore the transitions between various states in the pushdown automata, until the transitions between the states related to the property have been explored. In these and other embodiments, the various transitions may be compared with an expected path or expected performance to verify the network property. Using such an approach, network properties may be verified for packets whose header length may vary as packets are encapsulated and de-encapsulated along one or more tunnels.

Embodiments of the present disclosure are explained with reference to the accompanying drawings.

FIG. 1 illustrates an example environment 100 related to network property verification, in accordance with one or more embodiments of the present disclosure. FIG. 1 additionally illustrates the progression of a packet 150 through a network 120 (referred to as the packets 150a-150e) in the environment 100. In some embodiments, the environment 100 may include first and second external networks 110a and 110b in communication with the network 120. The environment 100 may include a control device 130 in communication with the network 120.

The first and second external networks 110a and 110b and the network 120 may include any network or configuration of networks configured to send and receive communications between devices. In some embodiments, the first and second external networks 110a and 110b may be configured to communicate using any number of protocols, including internet protocol suite (including for example, internet protocol (IP), transmission control protocol (TCP), user datagram protocol (UDP), internet control message protocol (ICMP), hypertext transfer protocol (HTTP), post office protocol (POP), and the like), AppleTalk, internetwork packet exchange/sequenced packet exchange (IPX/SPX), Open Systems Interconnection (OSI), Systems Network Architecture (SNA), DECnet, and others. Additionally or alternatively, the first and second external networks 110a and 110b and the network 120 may operate with multiple protocols or in a manner to accommodate multiple protocols, such as multiprotocol label switching (MPLS). In some embodiments, the first and second external networks 110a and 110b may operate using the internet protocol suite and the network 120 may operate as an MPLS network. In these and other embodiments, a portion of the network 120 may also operate using the internet protocol suite.

In some embodiments, the first and second external networks 110a and 110b and the network 120 may be implemented as a conventional type of network, a wired or wireless network, and/or may have numerous different configurations. Furthermore, the first and second external networks 110a and 110b and the network 120 may include a local area network (LAN), a wide area network (WAN) (e.g., the Internet), or other interconnected data paths across which multiple devices and/or entities may communicate. In some embodiments, the first and second external networks 110a and 110b and the network 120 may include a peer-to-peer network. The first and second external networks 110a and 110b and the network 120 may also be coupled to or may include portions of a telecommunications network for sending data in a variety of different communication protocols. In some embodiments, the first and second external networks 110a and 110b and the network 120 may include Bluetooth® communication networks or cellular communication networks for sending and receiving communications and/or data including via short message service (SMS), multimedia messaging service (MMS), hypertext transfer protocol (HTTP), direct data connection, wireless application protocol (WAP), e-mail, or other approaches. The first and second external networks 110a and 110b and the network 120 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks.

In some embodiments, the network 120 may include one or more edge network devices 122, such as edge network devices 122a and 122b. Additionally, the network 120 may include one or more internal network devices 124, such as internal network devices 124a-124d. The term "network device" may include edge network devices, internal network devices, and any other computing device configured to facilitate transfer of data between two (either physical or logical) locations in the network. The edge network devices 122 may operate at a boundary between the network 120 and an external network such as the edge network device 122a operating at a boundary between the network 120 and the first external network 110a. In these and other embodiments, any of the edge network devices 122 and the internal network devices 124 may be implemented as a computing device or computing system such as the computing system 500 of FIG. 5. For example, such a computing device may be provided MPLS-style forwarding rules that may inform the forwarding of packets, and such forwarding rules may be extracted from such a computing system.

In some embodiments, dashed lines between any of the edge network devices 122, the internal network devices 124, and/or the external networks 110 may represent physical connections between network devices such as coaxial cables, optical fibers, twisted pair cables (such as category 5 cable), or the like. Additionally or alternatively, the dashed lines may indicate a logical connection between the network devices. For example, the control device 130 and/or network handling software may treat the dashed line as comparable or similar to a physical connection between two network devices even if the dashed line represents more than one physical connections or mediums. The dashed lines coming into the network 120 from the external networks 110 may indicate one or more physical connections arriving at the edge network devices 122. The solid arrows indicate the flow of a packet 150 as it passes through the network 120.

For ease in illustration and to indicate the operation of the environment 100, the packet 150 is illustrated below the environment 100. The packet 150 may arrive at the network 120 addressed to the IP address 172.54.3.128 as illustrated by the packet 150a. As the packet progresses through the network 120, the packets 150a-150e illustrate how a header of the packet 150 may be modified through push and pop operations.

In some embodiments, the packet 150a may be routed from the first external network 110a to the edge network device 122a. The edge network device 122a may include forwarding rules that instruct the edge network device 122a to encapsulate the packet 150a with labels in the header. The labels in the header may determine a path that the packet 150a may traverse through the network 120. For example, a network device may read the outer label (also known as the top-most label in the stack of labels) and look up the label in forwarding rules of the network device and route the packet based on the forwarding rule that corresponds to the label. In some embodiments, a given label may correspond to an internal network device 124 that may route the packet 150a. For example, as illustrated in FIG. 1, the edge network device 122a may encapsulate the packet 150a with the labels A, B, and C in the header. The encapsulation of the header may be referred to as a push operation of adding the labels A, B, and C to the header of the packet 150a. Encapsulating the packet 150a with the labels A, B, and C in the header may result in the packet 150b being routed through the network 120. In some embodiments, the labels A, B, and C may represent a twenty bit value that is readable by a network device. In addition to the push operation, the edge network device 122a may be configured to route the packet 150b to the internal network device 124a.

The internal network device 124a may receive the packet 150b and may read the outermost label, A. Forwarding rules of the internal network device 124a may cause the internal network device 124a to, based on the label A, de-encapsulate the packet 150b by removing the label A resulting in the packet 150c. In these and other embodiments, de-encapsulation of a packet to remove a label may be referred to a POP of the label or popping the label. Additionally or alternatively, the forwarding rules of the internal network device 124a may cause the internal network device 124a to route the packet 150c to the internal network device 124b. In some embodiments, the internal network device 124a may read the outermost label and compare the label to forwarding rules stored on a storage medium of the internal network device 124a. After finding the label in the forwarding rules, the internal network device 124a may perform one or more operations associated with the label in the forwarding rules, such as de-encapsulating the packet 150b to remove the label A and routing the packet 150c to the internal network device 124b.

In a similar manner and based on the forwarding rules of the internal network device 124b, the internal network device 124b may de-encapsulate the packet 150c to remove the label B (POP B), resulting in the packet 150d. The internal network device 124d may route the packet 150d to the internal network device 124d. In a similar manner and based on the forwarding rules of the internal network device 124d, the internal network device 124d may de-encapsulate the packet 150d to remove the label C (POP C), resulting in the packet 150e. The internal network device 124d may route the packet 150e to the edge network device 122b. The edge network device 122b may be configured to route the packet 150e to the second external network 110b based on information associated with the packet 150e. For example, the edge network device 122b may be configured to route the packet 150e to the second external network 110b based on the IP address to which the packet 150e is directed.

While illustrated as performing de-encapsulation operations (POP A, POP B, and POP C), in some embodiments, the internal network devices 124 may be configured to only perform POP operations while in other embodiments, the internal network devices 124 may be configured to perform no operation, PUSH operations, POP operations, or any combinations thereof. In some embodiments, the operations performed may be determined by the forwarding rules of the internal network device.

In some embodiments, the control device 130 may be configured to obtain the physical layout of the network 120 and/or the forwarding rules of the network devices of the network 120. Additionally or alternatively, the control device 130 may be configured to obtain a layout of a data plane of the network at a given point in time. The data plane may refer to how packets are routed through a network, for example, the combination of the physical layout of the network and how the devices within the network route packets among the devices based on the forwarding rules. For example, the control device 130 may obtain the forwarding rules of each of the edge network devices 122 and the internal network devices 124 and the physical connections between the edge network devices 122 and the internal network devices 124. In some embodiments, the control device may be in communication with each of the edge network devices 122 and the internal network devices 124. Additionally or alternatively, the control device may be in communication with another electronic device that monitors the physical layout and/or the forwarding rules of the network 120. In these and other embodiments, the control device may be implemented as a computing device or a computing system such as the computing system 500 of FIG. 5.

In some embodiments, the control device 130 may be configured to verify one or more properties of the network 120. The properties may include network paths, network reachability, distances measured between points in the network according to the number of hops a packet may traverse for it to be delivered to the expected recipient, a form of packet travel time between two points in the network as a function of distance and capabilities of network links, network service time, among others. For example, the control device 130 may be configured to verify that a packet travels through the network 120 as expected by the control device 130, or that a packet travels through the network 120 as quickly as expected, or the like. For example, an administrator of the network 120 may expect a certain ingress and egress to be available, a certain network path to be followed, or a certain network packet travel time to be within a threshold. In some embodiments, the properties may be metrics placed by the administrator. In these and other embodiments, the properties may be based on forwarding rules of one or more devices within the network. Other properties may include detecting loops in the network and identifying network devices from which a packet can never be forwarded.

In some embodiments, the control device 130 may verify one or more properties of the network 120 by generating a pushdown automata representing the network and applying a saturation-based algorithm to the pushdown automata. A pushdown automata may include a first-in, first-out stack. For example, a pushdown automata that has elements, A, B, and C added in that order may include a stack of elements A, B, and C with only element C accessible. After element C has been removed, element B may be accessible, and after element B has been removed, element A may be accessible.

For example, the control device 130 may obtain a property to verify, such as the path from two external network devices 122a and 122b. Using the pushdown automata representation, the control device 130 may apply a saturation-based algorithm to explore the reachability space and the transitions within the network. As the control device 130 explores the pushdown automata using the saturation-based algorithm, the control device 130 may compare the representative transitions of the algorithm to an expected transition or destination. For example, the control device 130 may expect that the packet 150a with IP address 172.54.3.128 arriving at the edge network device 122a may be routed to the edge network device 122b. Based on the application of the saturation-based algorithm that explores the reachability space of the pushdown automata, the path may be verified that the packet 150a is routed through the network 120 from the edge network device 122a to the edge network device 122b. As another example, the control device 130 may expect that such a packet will travel along a path that includes the internal network device 124c. However, by applying the saturation-based algorithm to the pushdown automata may show that the path includes 124b rather than 124c. In these and other embodiments, such a result may trigger an error indicating that the operation of the network is outside of the expected behavior.

In some embodiments, the control device 130 may verify one or more properties of the network 120 by generating a representation of the network 120 as a pushdown automata. For example, the control device 130 may generate the pushdown automata by representing each of the edge network devices 122 and the internal network devices 124 as states in the push down automata, and representing the transitions between the states as one or more push or pop operations. The control device 130 may generate such a pushdown automata based on the forwarding rules of the edge network devices 122 and the internal network devices 124. For example, from a first state corresponding to the edge network device 122a to a second state corresponding to the edge network device 122b, the transition may include the operations of PUSH A B C, POP A, POP B, POP C. As another example, from a third state corresponding to the internal network device 124b to a fourth state corresponding to the internal network device 124d, the transition may include the operation POP B.

In some embodiments, the control device 130 may verify the one or more properties of the network 120 by comparing the expected behavior of the network 120 with the behavior as indicated by application of a saturation-based algorithm to the pushdown automata. A saturation-based algorithm may include an algorithm that address a large complex problem by solving a smaller local problem with known boundaries, and may iteratively proceed to solve other smaller problems with varying boundaries. For example, a transition from one network device to another may start with the small problem represented by the pushdown automata (e.g., the transition from one network device to a next network device), and may be expanded out starting with the already addressed transition to transitions across multiple network devices. As these paths are explored, those explored paths of how the network 120 is actually operating may be compared to expected paths of the control device 130.

For example, an administrator of the network 120 may input an expected path of a packet into the control device 130 based on how the administrator initially configured the network. Over time, due to fail-over scenarios, load-balancing, etc. one or more of the network paths may have changed. In these and other embodiments, the control device 130 may expect that a packet would travel along the expected path, but the pushdown automata may correspond to a different path indicating that the network 120 may not be operating as expected. Such a different path may cause the packet to be routed to an incorrect location, may cause the packet to take longer traversing the network 120 than expected, or any other issues associated with incorrectly routed packets. As another example, the administrator may expect a packet to take a certain amount of time to traverse the network 120 based on the original configuration of the network. Based on similar modifications to the network, a packet may take a more circuitous route identified by the application of the saturation-based algorithm, leading to an indication that the packet may have a travel time that exceeds the expected travel time through the network 120.

In some embodiments, based on all properties being verified, the control device may generate a message indicating that the network 120 is behaving as expected. In some embodiments, based on one or more properties not being verified, the control device 130 may take one or more actions to notify and/or otherwise address the lack of verification. In some embodiments, the control device 130 may generate a message to cause one or more network devices of the network 120 to change or update the forwarding rules of the network devices. As another example, the control device 130 may cause one or more network devices of the network 120 to activate or deactivate one or more physical communication channels. As an additional example, the control device 130 may cause one or more network devices of the network 120 to power down, power up, or otherwise adjust a mode of operation of the network device. In these and other embodiments, the action may be a remedial action to change the operation of the network to more closely match the expected behavior of the network. If the observed changes in the network are due to an erroneous manual or automated reconfiguration of the network (rather than, for example, a failure in the network), the control device may ignore, delay (with an appropriate warning message to the network operators), or reverse, the triggered changes of the network to preserve expected behavior of the network.

In some embodiments, the control device 130 may utilize a saturation-based algorithm in the verification of the one or more properties of the network 120. An example of applying such a saturation-based algorithm to a pushdown automata may be described with reference to FIGS. 4a-4c.

In some embodiments, the control device 130 may generate a visualization of one or more of the paths through the network 120. Additionally or alternatively, the control device 130 may include a visualization of an actual path compared to an expected path through the network 120. In some embodiments, the control device 130 may cause a display to present the visualization to an administrator of the network 120. Such display may include causing the control device 130 to display the visualization, or may include the control device 130 transmitting a message to an electronic device of the administrator to cause the electronic device to display the visualization. In some embodiments, the visualization may include a graphical representation of one or more network paths as a graph. Additionally or alternatively, the visualization may include one or more tables indicating one or more properties that are verified. In some embodiments, the visualization may include one or more paths, routes, ingress-egress pairs, or others, that illustrate a reachability graph. The reachability graph may indicate whether or not certain properties are verified.

Modifications, additions, or omissions may be made to the environment 100 without departing from the scope of the present disclosure. For example, the environment 100 may include any number of edge network devices 122 and internal network devices 124 connected in any manner. In many cases, the network 120 may include more network devices than illustrated. Additionally or alternatively, the environment 100 may include more than one control device. Additionally or alternatively, the network 120 may include any number of physical connections and/or logical connections in the network 120.

Figure 2:
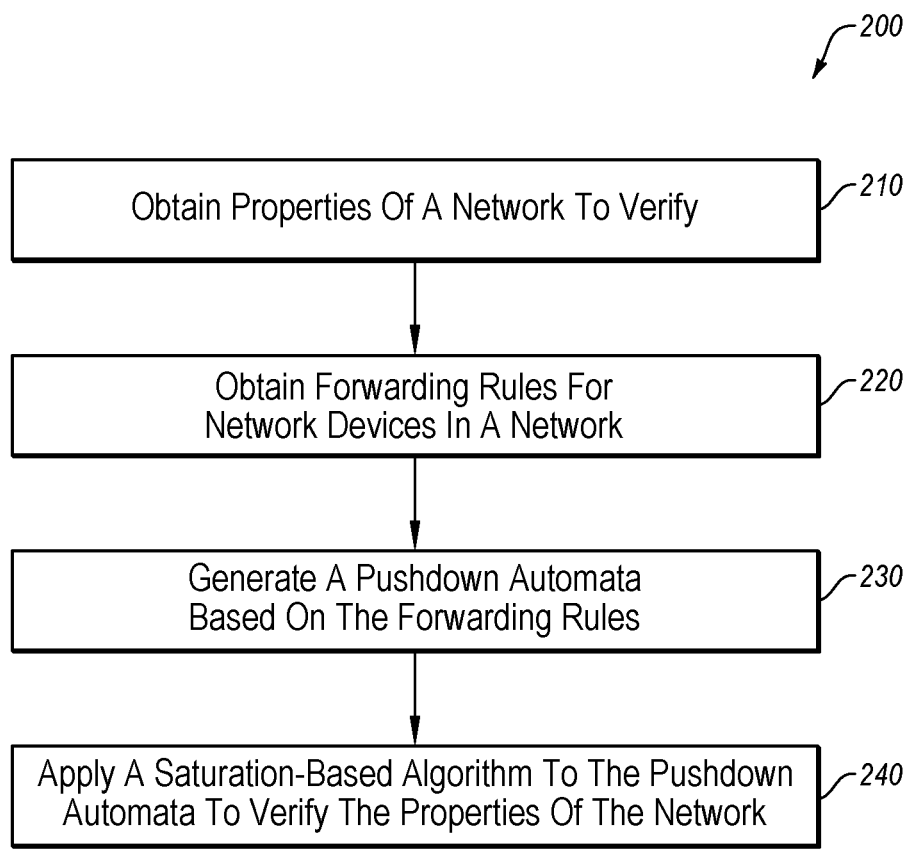
FIG. 2 illustrates a flowchart of an example method of network property verification.

FIG. 2 illustrates a flowchart of an example method 200 of network property verification, in accordance with one or more embodiments of the present disclosure. Although illustrated as discrete blocks, various blocks may be divided into additional blocks, combined into fewer blocks, or eliminated, depending on the particular implementation.

At block 210, properties of a network that are to be verified may be obtained. For example, a control device (such as the control device 130 of FIG. 1) may obtain properties of a network (such as the network 120 of FIG. 1) to be verified. In some embodiments, a user may interact with the control device to designate one or more properties to be verified. Additionally or alternatively, the control device may be configured to periodically verify one or more properties of the network. In some embodiments, a network failure or network realignment (such as reassigning a physical network connection) may trigger the control device to verify one or more properties of the network. In some embodiments, the control device may maintain the properties of the network as expected behavior of the network. In some embodiments, the network may include an MPLS network.

At block 220, forwarding rules for network devices in the network may be obtained. For example, the control device may obtain forwarding rules for edge network devices (such as the edge network devices 122 of FIG. 1) and/or internal network devices (such as the internal network devices 124 of FIG. 1) related to the properties obtained at block 210. For example, if the property to be verified includes paths across the entire network, all forwarding rules for all network devices of the network may be obtained by the control device. As another example, if the property to be verified is related to one particular path or performance of one particular path (such as a path using a new physical connection), only forwarding rules of the network devices used in the particular path may be obtained. In some embodiments, the control device may send a message to one or more network devices to instruct the network devices to retrieve the forwarding rules stored on the one or more network devices and return a message to the control device with the forwarding rules.

At block 230, a pushdown automata may be generated based on the forwarding rules. For example, the control device may utilize the forwarding rules of the network devices to generate a pushdown automata to represent the network. In some embodiments, generation of the pushdown automata may be accomplished by representing each network device related to the properties to be verified (which may include all network devices in the network in some embodiments) as one or more states in the pushdown automata. For example, with reference to FIG. 1, the edge network device 122a may be a first state, the internal network device 124a may be a second state, and the internal network device 124b may be a third state. Additionally or alternatively, in generating the pushdown automata, the forwarding rules may be encoded as pushdown automata push or pop operations. For example, for the transition from the first state to the second state, the transition may be encoded as PUSH A, PUSH B, PUSH C. As another example, the transition from the second state to the third state may be encoded as POP A.

At block 240, a saturation-based algorithm may be applied to the pushdown automata to verify the properties of the network. For example, the control device may apply the saturation-based algorithm to the pushdown automata such that in applying the algorithm, at one or more steps in the algorithm, the control device may compare the property to a feature of the pushdown automata. In some embodiments, the saturation-based algorithm may explore the reachability space of the network to verify one or more operations that represent the transition across multiple hops in the network. For example, beginning with a single transition in the pushdown automata, the saturation-based algorithm may expand the boundaries of the transitions to further and further states corresponding to earlier and/or later network devices in the network. Following the example of the block 230, the transition from the first state to the third state may be encoded as PUSH A, PUSH B, PUSH C, POP A by application of the saturation-based algorithm. In exploring the space, reachability from one network device to another may be verified as the space is explored. For example, if the control device were performing a reachability query of a packet from the edge network device 122a to the edge network device 122b of FIG. 1, the control device may explore the reachability space until a transition from the two network devices may be determined as PUSH A, PUSH B, PUSH C, POP A, POP B, POP C. One example of the application of such a saturation-based algorithm may be described with reference to FIGS. 4a-4c.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. For example, some embodiments may include implementation and optimization techniques for checking the reachability of Dyck context-free languages.

Figure 3:
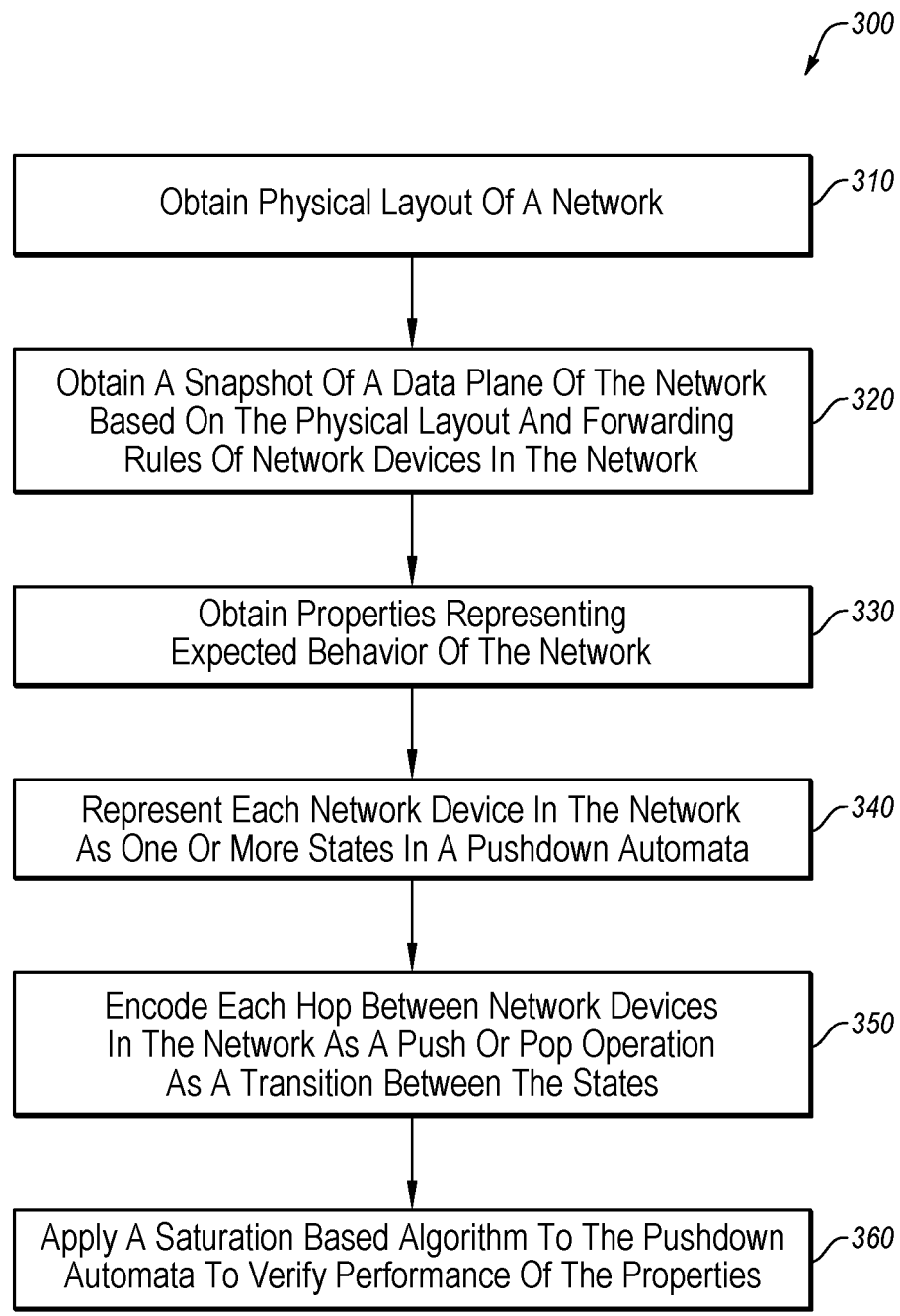
FIG. 3 illustrates a flowchart of another example method of network property verification.

FIG. 3 illustrates a flowchart of another example method 300 of network property verification, in accordance with one or more embodiments of the present disclosure. Although illustrated as discrete blocks, various blocks may be divided into additional blocks, combined into fewer blocks, or eliminated, depending on the particular implementation.

At block 310, a physical layout of a network may be obtained. For example, a control device (such as the control device 130 of FIG. 1) may maintain an electronic representation of the physical layout of a network (such as the network 120 of FIG. 1) such that as physical connections or network devices are changed in the network, the control device may adjust the electronic representation. As another example, the control device may receive such an electronic representation of the physical layout of the network from another device or devices. For example, each network device in the network may transmit a message to the control device identifying the network device and any associated connections in the network.

At block 320, a layout of a data plane of the network for a given point in time may be obtained. For example, the control device may obtain forwarding rules of network devices (such as the edge network devices 122 and the internal network devices 124 of FIG. 1) in a similar manner to that described with respect to the block 220 of FIG. 2. Using the physical layout and the forwarding rules of the network devices, the control device may obtain the layout of the data plane. For example, the layout may represent the manner in which packets are physically routed through the network based on the physical connections and the forwarding rules of the network devices in the network. In some embodiments, the control device may generate the layout, while in other embodiments the control device may be provided the layout from another device.

At block 330, properties representing expected behavior of the network may be obtained. For example, the control device may maintain a set of properties representing expected performance of the network, such as routing of packets through the network, travel times through the network, or the like. In some embodiments, such properties may be set by a user such as a network administrator by interacting with the control device. In some embodiments, the block 330 may be similar or comparable to the block 210 of FIG. 2.

At block 340, each network device in the network may be represented as one or more states in a pushdown automata. For example, in representing the network as a pushdown automata, the control device may represent each network device as a state in the pushdown automata. In some embodiments, the pushdown automata is generated based on the layout of the data plane, including one or more of the physical layout of the network and the forwarding rules of the network devices.

At block 350, each hop in the network between network devices in the network may be encoded as one or more push or pop operations as a transition between the states, corresponding to encapsulation or de-encapsulation of a packet, respectively. For example, the control device may read the forwarding rules of a first network device to a second network device, and based on the forwarding rule from the first network device to the second network device, encode the transition from the first network device to the second network device as one or more push or pop operations in the pushdown automata.

At block 360, a saturation-based algorithm may be applied to the pushdown automata to verify one or more of the properties of the network. For example, the control device may apply the saturation-based algorithm to the pushdown automata to verify the properties obtained at the block 330. In some embodiments, the block 360 may be similar or comparable to the block 240 of FIG. 2.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 4A:
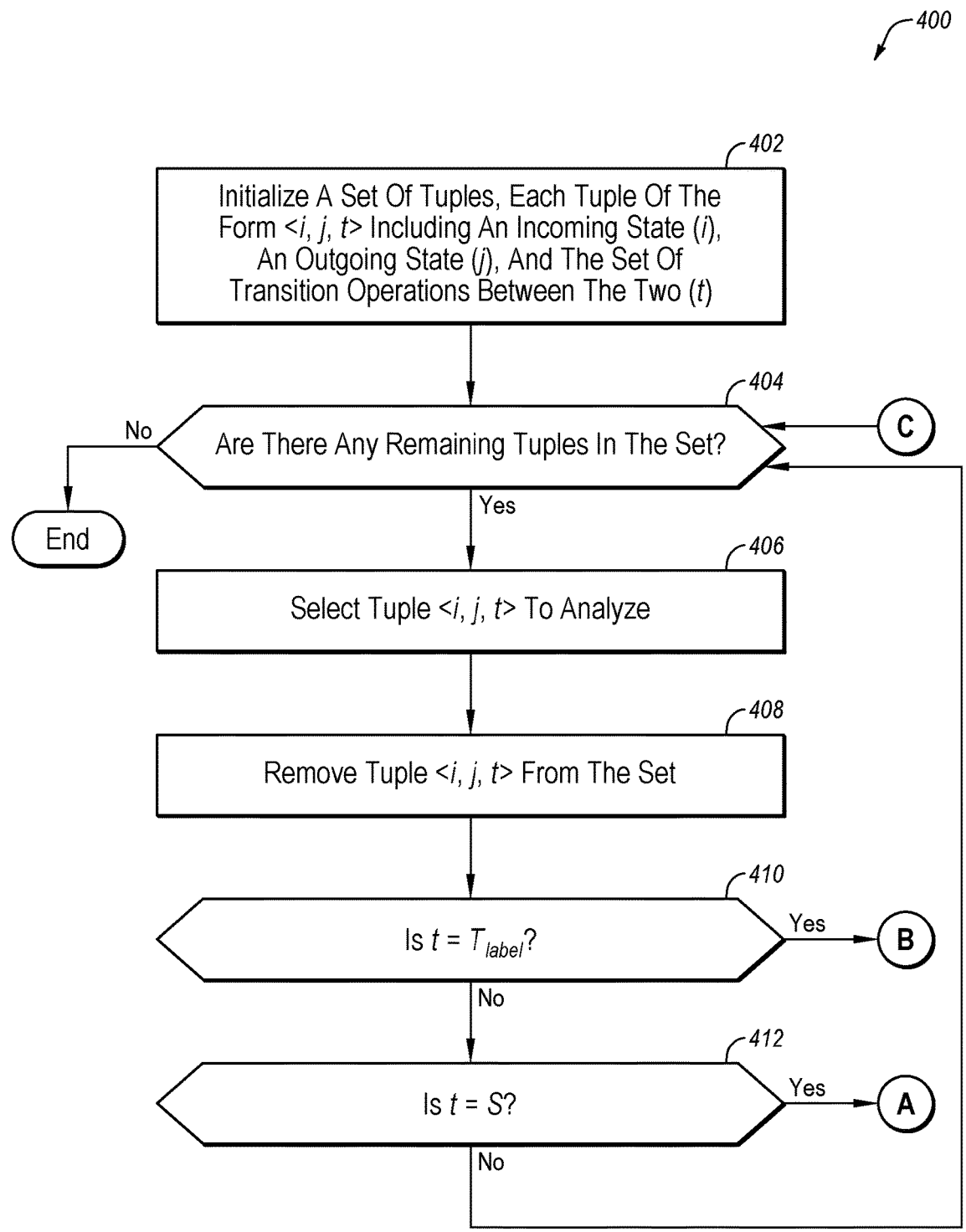
FIGS. 4a-4c illustrate flowcharts of example methods of applying a saturation-based algorithm to facilitate verification of a network property.
Figure 4B:
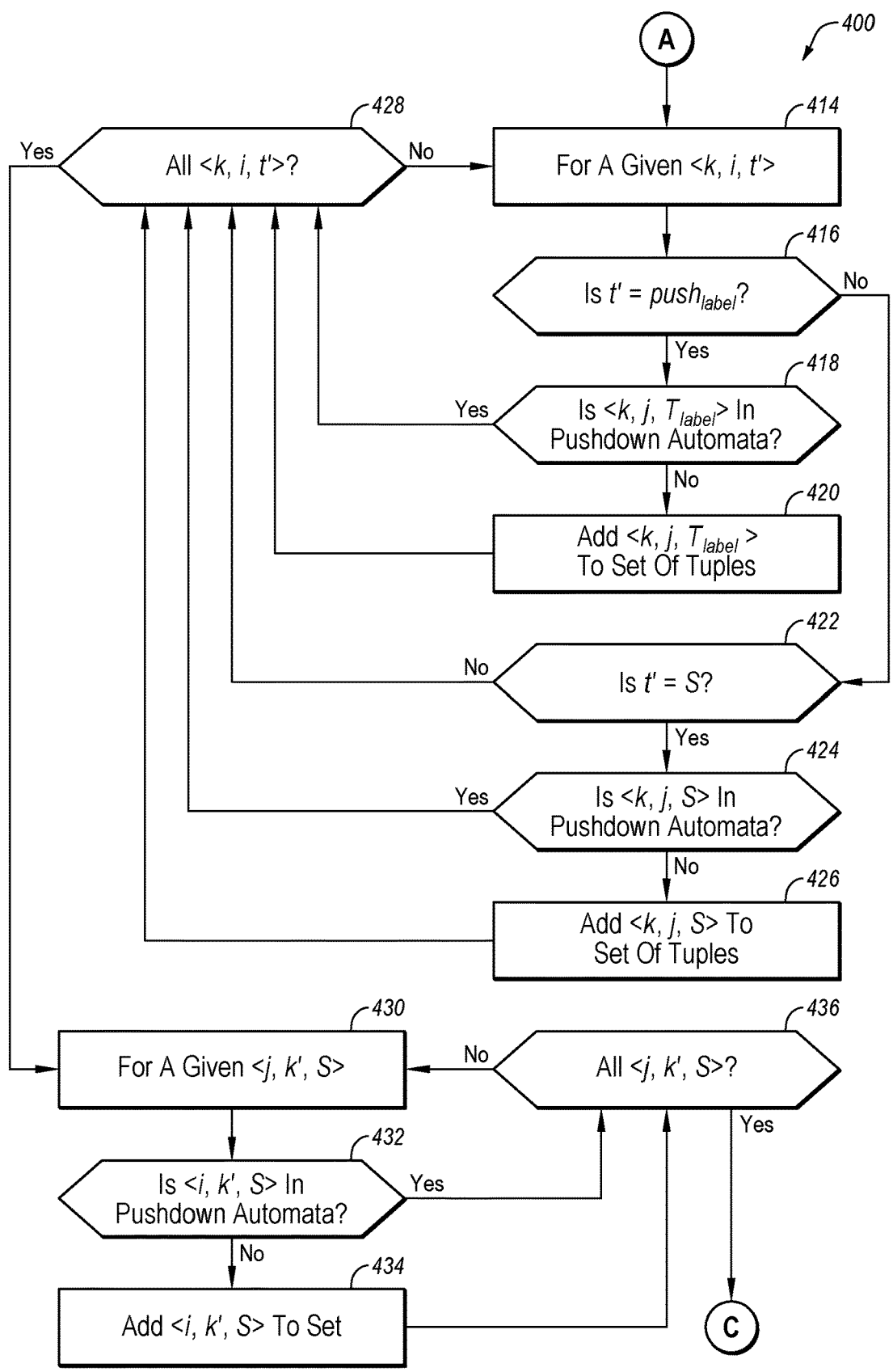
Figure 4C:
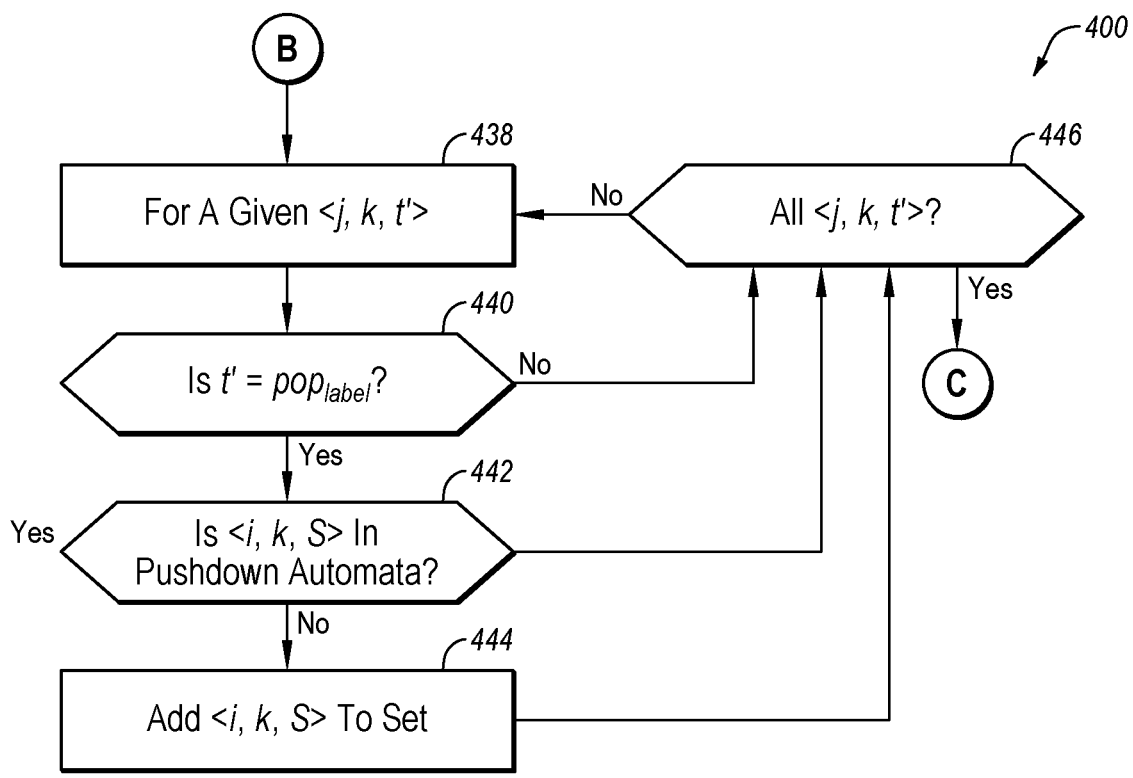

FIGS. 4a-4c illustrate flowcharts of example method 400 of applying a saturation-based algorithm to facilitate verification of a network property, in accordance with one or more embodiments of the present disclosure. For example, the method 400 may illustrate various aspects of applying a saturation-based algorithm to a pushdown automata such that one or more properties of a network represented by the pushdown automata may be verified. Although illustrated as discrete blocks, various blocks may be divided into additional blocks, combined into fewer blocks, or eliminated, depending on the particular implementation.

With reference to FIGS. 4a-4c, network devices may be represented as states and transition operations may represent the forwarding rules utilized by the network in routing a packet between network devices.

At block 402, a set of tuples (for example, triples) may be initialized, referred to as the set W. For example, a control device (such as the control device 130 of FIG. 1) may initialize a set of tuples as part of the saturation-based algorithm. The tuples may take the form <i, j, t> where i may represent an incoming state, j may represent an outgoing state, and t may represent the transition operation between the incoming state and the outgoing state. In some embodiments, the incoming and outgoing states in the tuples may be states from a pushdown automata that represent the behavior of network devices in a network. In these and other embodiments, the transition operation may be a transition from the pushdown automata that occur between the incoming and outgoing states in the tuples.

The transition operations t may include "$\text{push}_{label}$" or "$\text{pop}_{label}$" operations, or a special form of transition, "$T_{label}$," or "S." The language accepted by the pushdown automata is a form of Dyck context-free language, which may be referred to as MPLS-CFL. Stated mathematically, MPLS-CFL may be defined as:

$S \to \text{' '}$
$S \to SS$
$S \to T_{label}\, \text{pop}_{label}$
$T_{label} \to \text{push}_{label}\, S$ By way of example, with reference to a first state corresponding to the edge network device 122a of FIG. 1 and a second state corresponding to the internal network device 124a, with the transition operation of PUSH A, PUSH B, PUSH C, a tuple may include i as the first state (the incoming state corresponding to the internal network device 124a), j as the second state (the outgoing state corresponding to the internal network device 124a). Since i performs a sequence of operations, namely, $\text{push}_A\, \text{push}_B\, \text{push}_C$, two auxiliary states x and y may be introduced. The pushdown automata may include four states and three transitions that may be represented by the tuples <i, x, $\text{push}_A$>, <x, y, $\text{push}_B$>, and <y, j, $\text{push}_C$>.

With reference to the block 402, the initialized set of tuples may also include tuples <k, k, S>, where k represents a state in the pushdown automata (such as a pushdown automata generated as described with reference to FIGS. 2 and/or 3) and S is one of the special symbols as defined above as there is no operation to go from a state to the same state.

At block 404, a determination may be made as to whether any tuples are remaining in the set of tuples W. In the initial pass through the method 400, there may be a tuple for each of the states that may be explored as the method 400 progresses. After a determination that there are remaining tuples to be analyzed, the method 400 may proceed to the block 406. After a determination that there are no remaining tuples to be analyzed, the method 400 may be completed.

At block 406, a tuple may be selected to be analyzed. The tuple to be analyzed may be referred to as the tuple <i, j, t> for convenience in the analysis of the tuple, and corresponding variables in the analysis may refer to the tuple to be analyzed by these variables.

At block 408, the tuple <i, j, t> may be removed from the set W.

At block 410, a determination may be made as to whether t is of the form $T_{label}$, or if the operation of the transition from the state i to the state j is a push operation. After a determination that t is of the form $T_{label}$, the method 400 may proceed to the block B, which may be continued with reference to FIG. 4c. After a determination that t is not of the form $T_{label}$, the method 400 may proceed to the block 412.

At the block 412, a determination may be made as to whether t is of the form S (for example, if the operation of the transition from the state i to the state j causes the stack of labels to be empty). After a determination that t is of the form S, the method 400 may proceed to the block A, which may be continued with reference to FIG. 4b. After a determination that t is not of the form S, the method 400 may return to the block 404 to determine if there are any remaining tuples to be analyzed.

With reference to FIG. 4b, as a continuation of the block A, the method 400 may explore the expanded space of transitions arriving at the tuple <i, j, t> from a preceding state k or transitions proceeding from the tuple <i, j, t> to a further state k' after the tuple.

At block 414, the method 400 may follow a flow for a given <k, i, t'> to be analyzed. For example, the tuple <k, i, t'> may represent the transition operation t' to arrive at the incoming state i from a preceding state k.

At block 416, a determination may be made as to whether the transition t' to arrive at the incoming state i includes a push operation $push_{label}$. After determining that the transition operation t' includes $push_{label}$, the method 400 may proceed to the block 418. After determining that the transition operation t' does not include $push_{label}$, the method 400 may proceed to the block 422.

At block 418, a determination may be made as to whether an expanded incoming tuple <k, j, $T_{label}$> is in the pushdown automata. For example, the tuple <k, j, $T_{label}$> may represent transitions from a preceding state k to the outgoing state j of the tuple being analyzed where the set S takes the special form $T_{label}$ as it was determined at the block 416 that the transition to arrive at the incoming state i included a push operation. After determining that <k, j, $T_{label}$> is not in the pushdown automata, the method 400 may proceed to the block 420. After determining that <k, j, $T_{label}$> is in the pushdown automata, the method 400 may proceed to the block 428. In some embodiments, the block 418 may facilitate exploring the expanded space from a preceding state k (prior to the incoming state i) to the outgoing state j.

At block 420, the tuple <k, j, $T_{label}$> may be added to the pushdown automata and to the set W of tuples to be analyzed.

At block 422, a determination may be made as to whether t' is of the form S. The block 422 may be similar or comparable to the block 412, although comparing t' rather than t. After a determination that t' is of the form S, the method 400 may proceed to block 424. After a determination that t' is not of the form S, the method 400 may proceed to the block 428.

At block 424, a determination may be made as to whether an expanded incoming tuple <k, j, S> is in the pushdown automata. For example, the tuple <k, j, S> may represent transitions from a preceding state k to the outgoing state j of the tuple being analyzed. After determining that <k, j, S> is not in the pushdown automata, the method 400 may proceed to the block 426. After determining that <k, j, S> is in the pushdown automata, the method 400 may proceed to the block 428. In some embodiments, the block 424 may facilitate exploring the expanded space from a preceding state k (prior to the incoming state i) to the outgoing state j.

At block 426 the tuple <k, j, S> may be added to the pushdown automata and to the set W of tuples to be analyzed.

At block 428, a determination may be made as to whether there are any additional tuples of the form <k, i, t'> in the pushdown automata that have not been processed through the blocks 414-426. After a determination that there are additional tuples of the form <k, i, t'> to be analyzed, the method 400 may return to the block 414 to analyze a next tuple of the form <k, i, t'>. After a determination that all tuples of the form <k, i, t'> in the pushdown automata have been analyzed (e.g., all transitions from a preceding state k to the incoming state i), the method 400 may proceed to the block 430.

At block 430, the method 400 may follow a flow for a given <j, k', S> to be analyzed. For example, the tuple <j, k', S> may represent the transition operation S to proceed from the outgoing state j to a further state k'.

At block 432, a determination may be made as to whether an expanded departing tuple <i, k', S> is in the pushdown automata. For example, the tuple <i, k', S> may represent transitions from the incoming state i to a further state k' of the tuple being analyzed. After determining that <i, k', S> is not in the pushdown automata, the method 400 may proceed to the block 434. After determining that <i, k', S> is in the pushdown automata, the method 400 may proceed to the block 436. In some embodiments, the block 432 may facilitate exploring the expanded departing space from the incoming state i to a state k' beyond the outgoing state j.

At block 434, the tuple <i, k', S> may be added to the pushdown automata and to the set W of tuples to be analyzed.

At block 436, a determination may be made as to whether there are any additional tuples of the form <j, k', S> in the pushdown automata that have not been processed through blocks 430-434. After a determination that there are additional tuples of the form <j, k', S> to be analyzed, the method 400 may return to the block 430 to analyze a next tuple of the form <j, k', S>. After a determination that all tuples of the form <j, k', S> in the pushdown automata have been analyzed (e.g., all transitions from the outgoing state j to a further state k'), the method 400 may proceed to block C. As illustrated in FIG. 4a, the block C may return to the block 404 to determine if there are any remaining tuples in the set W that have not yet been analyzed.

With reference to FIG. 4c, as a continuation of the block B of FIG. 4a, the method 400 may explore the expanded space of transitions arriving at the tuple <i, j, t> and proceeding to a further state k after the tuple. For example, the blocks 442, 444, and 446 may be similar or comparable to the blocks 432, 434, and 436, respectively.

At block 438, the method 400 may follow a flow for a given <j, k, t'> to be analyzed. For example, the tuple <j, k, t'> may represent the transition operation t' to proceed from the outgoing state j to a further state k'.

At block 440, a determination may be made as to whether the transition t' to transition from the outgoing state j to the further state k includes a pop operation $pop_{label}$. After determining that the transition operation t' includes the pop operation $pop_{label}$, the method 400 may proceed to the block 442. After determining that the transition operation t' does not include the pop operation $pop_{label}$, the method 400 may proceed to the block 446.

At block 442, a determination may be made as to whether an expanded departing tuple <i, k, S> is in the pushdown automata. For example, the tuple <i, k, S> may represent transitions from the incoming state i to a further state k of the tuple being analyzed. After determining that <i, k, S> is not in the pushdown automata, the method 400 may proceed to the block 444. After determining that <i, k, S> is in the pushdown automata, the method 400 may proceed to the block 446. In some embodiments, the block 442 may facilitate exploring the expanded departing space from the incoming state i to a state k beyond the outgoing state j.

At block 444, the tuple <i, k, S> may be added to the pushdown automata and to the set W of tuples to be analyzed.

At block 446, a determination may be made as to whether there are any additional tuples of the form <j, k, t'> in the pushdown automata that have not been processed through blocks 440-444. After a determination that there are additional tuples of the form <j, k, t'> to be analyzed, the method 400c may return to the block 438 to analyze a next tuple of the form <j, k, t'>. After a determination that all tuples of the form <j, k, t'> in the pushdown automata have been analyzed (e.g., all transitions from the outgoing state j to a further state k), the method 400 may proceed to block C. As illustrated in FIG. 4a, the block C may return to the block 404 to determine if there are any remaining tuples in the set W that have not yet been analyzed.

In some embodiments, as the method 400 is utilized, one or more transitions of interest may be analyzed and/or observed to verify a property of a network. For example, an expected property such as a network path may be compared to the transition operations observed during the application of the saturation-based algorithm to the pushdown automata corresponding to the expected path to confirm that the expected network path and the actual operation of the network are the same. If there is a mismatch between a property and the observations during the application of the saturation-based algorithm, an error or other warning may be raised. Additionally or alternatively, if a tuple corresponding to an unexpected network path is observed or generated during the application of the saturation-based algorithm, a corresponding error or warning may be raised. In some embodiments, the control device may generate a report indicative of what errors or inconsistencies between the expected behavior and the observed behavior occur. In some embodiments, a saturated pushdown automata may be generated and one or more properties of a network may be verified by application of a graph algorithm or other separate reachability inquiry being applied to the saturated pushdown automata.

Any of the methods 200, 300, or 400 of FIGS. 2, 3, and 4a-4c may be performed by any suitable system, apparatus, or device. For example, the environment 100 of FIG. 1 or one or more of the components thereof such as the control device 130 may perform one or more of the operations associated with the methods 200, 300, and/or 400. In these and other embodiments, program instructions stored on a computer readable medium may be executed to perform one or more of the operations of the methods 200, 300, and/or 400. Modifications, additions, or omissions may be made to any of the methods 200, 300, and/or 400 without departing from the scope of the present disclosure. For example, the operations of the methods 200, 300, and/or 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 5:
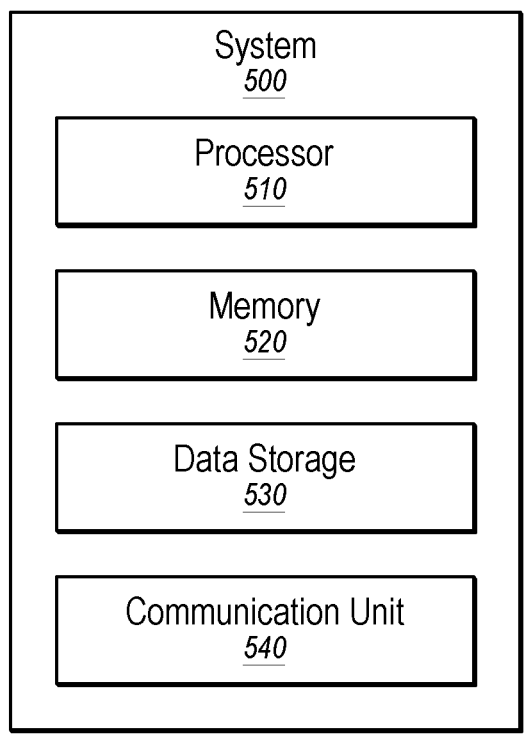
FIG. 5 illustrates an example computing system.

FIG. 5 illustrates an example computing system 500, according to at least one embodiment described in the present disclosure. The system 500 may include any suitable system, apparatus, or device configured to test software. The computing system 500 may include a processor 510, a memory 520, a data storage 530, and a communication unit 540, which all may be communicatively coupled. The data storage 530 may include various types of data, such as forwarding rules for use in an MPLS network.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 510 may include any number of processors distributed across any number of network or physical locations that are configured to perform individually or collectively any number of operations described in the present disclosure. In some embodiments, the processor 510 may interpret and/or execute program instructions and/or process data stored in the memory 520, the data storage 530, or the memory 520 and the data storage 530. In some embodiments, the processor 510 may fetch program instructions from the data storage 530 and load the program instructions into the memory 520.

After the program instructions are loaded into the memory 520, the processor 510 may execute the program instructions, such as instructions to perform the methods 200, 300, and/or 400 FIGS. 2, 3, and 4a-c, respectively. For example, the processor 510 may obtain forwarding rules of network devices in a network, and may generate a pushdown automata representing that network based on the forwarding rules. As another example, the processor 510 may apply a saturation-based algorithm to such a pushdown automata.

The memory 520 and the data storage 530 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 510. In some embodiments, the computing system 500 may or may not include either of the memory 520 and the data storage 530.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations.

The communication unit 540 may include any component, device, system, or combination thereof that is configured to transmit or receive information over a network. In some embodiments, the communication unit 540 may communicate with other devices at other locations, the same location, or even other components within the same system. For example, the communication unit 540 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 540 may permit data to be exchanged with a network and/or any other devices or systems described in the present disclosure. For example, the communication unit 540 may allow the system 500 to communicate with other systems, such as network devices, control devices, and/or other networks.

Modifications, additions, or omissions may be made to the system 500 without departing from the scope of the present disclosure. For example, the data storage 530 may be multiple different storage mediums located in multiple locations and accessed by the processor 510 through a network.

As indicated above, the embodiments described in the present disclosure may include the use of a special purpose or general purpose computer (e.g., the processor 510 of FIG. 5) including various computer hardware or software modules, as discussed in greater detail below. Further, as indicated above, embodiments described in the present disclosure may be implemented using computer-readable media (e.g., the memory 520 or data storage 530 of FIG. 5) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method of network property verification, the method comprising:
    obtaining one or more properties of a network to verify;
    obtaining first forwarding rules for a first network device in the network, the first forwarding rules indicative of how the first network device handles an incoming packet with a variable-length packet header;

obtaining second forwarding rules for a second network device in the network, the second forwarding rules indicative of how the second network device handles the incoming packet;

generating a pushdown automata based on the first and the second forwarding rules, wherein generating the pushdown automata comprises:

representing each network device as one or more states in the pushdown automata;

encoding each forwarding rule of the first and second forwarding rules as one of a push operation corresponding to an encapsulation operation and a pop operation corresponding to a de-encapsulation operation; and using the push and the pop operations as transitions between the one or more states; and applying a saturation-based algorithm to the pushdown automata to verify the one or more properties of the network.

2. The method of claim 1, wherein the first and the second network devices are configured to perform at least one of an encapsulation operation and a de-encapsulation operation on a packet.

3. The method of claim 2, wherein the first and the second network devices are configured to operate using multiprotocol label switching (MPLS).

4. The method of claim 1, further comprising generating a reachability graph of a packet traveling from the first network device to the second network device across the network.

5. The method of claim 1, further comprising:

obtaining a physical layout of the network; and obtaining a layout of a data plane of the network for a given point in time based on the physical layout of the network and the first and the second forwarding rules.

6. The method of claim 1, wherein applying the saturation-based algorithm includes:

representing each connection between network devices in the network as a tuple with an incoming state, an outgoing state, and a transition operation from the incoming state to the outgoing state, the transition operation including one or more of the push operations and the pop operations; and for each tuple, determining whether the transition operation includes the push operation.

7. The method of claim 6, further comprising, for each tuple where the transition operation does not include the push operation:

analyzing each arriving tuple representing transitions arriving at the incoming state from a preceding state to determine whether a given arriving transition operation of a given arriving tuple includes the push operation, and if the given arriving transition operation includes the push operation, confirming an expanded arriving tuple representing transitions arriving from the preceding state to the outgoing state has been added to the pushdown automata, and if the given arriving transition operation does not include the push operation, confirming the given arriving tuple has been added to the pushdown automata; and analyzing each departing tuple representing transitions departing from the outgoing state to a further state to determine whether an expanded departing tuple representing a transition from the incoming state to the further state is included in the pushdown automata, and if not, adding the expanded departing tuple to the pushdown automata.

8. The method of claim 6, further comprising, for each tuple where the transition operation includes the push operation:

analyzing each departing tuple representing transitions departing from the outgoing state to a further state to determine whether a given departing transition operation of a given departing tuple includes the pop operation; and if the given departing transition operation includes the pop operation, determining whether an expanded departing tuple representing a transition from the incoming state to the further state is included in the pushdown automata, and if not included in the pushdown automata, adding the expanded departing tuple to the pushdown automata.

9. The method of claim 6, wherein the transition operation includes more than one of the push operations and the pop operations such that the incoming state and the outgoing state are representative of two network devices with intervening network devices between the two network devices.

10. The method of claim 1, wherein at least one of the one or more properties includes a network path and applying a saturation-based algorithm to the pushdown automata to verify the one or more properties of the network comprises:

comparing an observed path of the network path generated by the application of the saturation-based algorithm to the pushdown automata to an expected network path of the network path; and based on the observed path matching the expected network path, verifying the network path.

11. One or more non-transitory computer-readable media including instructions that, in response to being executed by one or more processors, cause a system to perform operations, the operations comprising:

obtaining one or more properties of a network to verify;

obtaining first forwarding rules for a first network device in the network, the first forwarding rules indicative of how the first network device handles an incoming packet with a variable-length packet header;

obtaining second forwarding rules for a second network device in the network, the second forwarding rules indicative of how the second network device handles the incoming packet;

generating a pushdown automata based on the first and the second forwarding rules, wherein generating the pushdown automata comprises:

representing each network device as a state in the pushdown automata;

encoding each forwarding rule of the first and second forwarding rules as one of a push operation corresponding to an encapsulation operation and a pop operation corresponding to a de-encapsulation operation; and using the push and the pop operations as transitions between the states; and applying a saturation-based algorithm to the pushdown automata to verify the one or more properties of the network.

12. The computer-readable media of claim 11, wherein the first and the second network devices are configured to operate using multiprotocol label switching (MPLS).

13. The computer-readable media of claim 11, wherein applying the saturation-based algorithm includes:

representing each connection between network devices in the network as a tuple with an incoming state, an outgoing state, and a transition operation from the incoming state to the outgoing state, the transition operation including one or more of the push operations and the pop operations;

for each tuple, determining whether the transition operation includes the push operation;

for each tuple where the transition operation does not include the push operation:

analyzing each arriving tuple representing transitions arriving at the incoming state from a preceding state to determine whether a given arriving transition operation of a given arriving tuple includes the push operation, and if the given arriving transition includes the push operation, confirming an expanded arriving tuple representing a transition from the preceding state to the outgoing state has been added to the pushdown automata, and if the given arriving transition does not include the push operation, confirming the given arriving tuple has been added to the pushdown automata; and analyzing each departing tuple representing transitions departing from the outgoing state to a further state to determine whether a first given expanded departing tuple representing a transition from the incoming state to the further state is included in the pushdown automata, and if not, adding the first given expanded departing tuple to the pushdown automata; and for each tuple where the transition operation includes the push operation:

analyzing each of the departing tuples to determine whether a given departing transition operation of a second given departing tuple includes the pop operation; and if the second given departing transition operation includes the pop operation, determining whether a second expanded departing tuple representing a transition from the incoming state to the further state is included in the pushdown automata, and if not included in the pushdown automata, adding the second expanded departing tuple to the pushdown automata.

14. A system comprising:
a first network device including a first storage device storing first forwarding rules indicative of how the first network device handles an incoming packet with a variable-length packet header;
a second network device in communication with the first network device over a network, the second network device including a second storage device storing second forwarding rules indicative of how the second network device handles the incoming packet;
a control device including:
  one or more processors; and
  one or more non-transitory computer-readable media including instructions that, in response to being executed by the one or more processors, cause the control device to perform operations, the operations comprising:
    obtaining one or more properties of the network to verify;
    obtaining the first and the second forwarding rules;
    generating a pushdown automata based on the first and the second forwarding rules, wherein generating the pushdown automata comprises:
      representing each network device as a state in the pushdown automata;
      encoding each forwarding rule of the first and second forwarding rules as one of a push operation corresponding to an encapsulation operation and a pop operation corresponding to a de-encapsulation operation; and
      using the push and the pop operations as transitions between the states; and
    applying a saturation-based algorithm to the pushdown automata to verify the one or more properties of the network.

15. The system of claim 14, wherein the first and the second network devices are configured to perform at least one of an encapsulation operation and a de-encapsulation operation on the packet.

16. The system of claim 14, wherein the first and the second network devices are configured to operate using multiprotocol label switching (MPLS).

17. The system of claim 14, wherein applying the saturation-based algorithm includes:
representing each connection between network devices in the network as a tuple with an incoming state, an outgoing state, and a transition operation from the incoming state to the outgoing state, the transition operation including one or more of the push operations and the pop operations;
for each tuple, determining whether the transition operation includes the push operation;
  for each tuple where the transition operation does not include the push operation:
    analyzing each arriving tuple representing transitions arriving at the incoming state from a preceding state to determine whether a given arriving transition operation of a given arriving tuple includes the push operation, and
      if the given arriving transition includes the push operation, confirming an expanded arriving tuple representing a transition from the preceding state to the outgoing state has been added to the pushdown automata, and
      if the given arriving transition does not include the push operation, confirming the given arriving tuple has been added to the pushdown automata; and
    analyzing each departing tuple representing transitions departing from the outgoing state to a further state to determine whether a first given expanded departing tuple representing a transition from the incoming state to the further state is included in the pushdown automata, and if not, adding the first given expanded departing tuple to the pushdown automata; and
  for each tuple where the transition operation includes the push operation:
    analyzing each of the departing tuples to determine whether a given departing transition operation of a second given departing tuple includes the pop operation; and
    if the second given departing transition operation includes the pop operation, determining whether a second expanded departing tuple representing a transition from the incoming state to the further state is included in the pushdown automata, and if not included in the pushdown automata, adding the second expanded departing tuple to the pushdown automata.

\* \* \* \* \*